United States Patent
Conti et al.

(10) Patent No.: US 9,857,826 B2
(45) Date of Patent: Jan. 2, 2018

(54) CONTROL AND STEERING DEVICE FOR A CRAWLER VEHICLE

(75) Inventors: Enrico Conti, Brescia (IT); Sergio Magrini, Modena (IT); Franco Pertusi, Modena (IT); Lorenzo Sghedoni, Marzaglia (IT); Ivano Resca, S. Giovanni in Persiceto (IT)

(73) Assignee: CNH Industrial America LLC, New Holland, PA (US)

( * ) Notice: Subject to any disclaimer, the term of this patent is extended or adjusted under 35 U.S.C. 154(b) by 331 days.

(21) Appl. No.: 13/881,105

(22) PCT Filed: Oct. 28, 2011

(86) PCT No.: PCT/EP2011/069018
§ 371 (c)(1),
(2), (4) Date: Oct. 2, 2013

(87) PCT Pub. No.: WO2012/056012
PCT Pub. Date: May 3, 2012

(65) Prior Publication Data
US 2014/0013896 A1    Jan. 16, 2014

(30) Foreign Application Priority Data
Oct. 29, 2010   (IT) .............................. MO2010A0304

(51) Int. Cl.
*G05G 1/04*  (2006.01)
*E02F 9/20*  (2006.01)
*B62D 1/14*  (2006.01)

(52) U.S. Cl.
CPC .................. *G05G 1/04* (2013.01); *B62D 1/14* (2013.01); *E02F 9/2004* (2013.01); *Y10T 74/20612* (2015.01)

(58) Field of Classification Search
CPC ........... Y10T 74/20612; Y10T 74/2063; Y10T 74/20732; Y10T 74/20582; Y10T 74/20474; Y10T 74/20738; Y10T 74/20762; Y10T 74/20756; Y10T 74/20606; Y10T 74/2093; G05G 1/06; G05G 1/04; G05G 1/085; G05G 1/062;
(Continued)

(56) References Cited

U.S. PATENT DOCUMENTS 1,874,522 A * 8/1932 Henrichsen ............. B64C 13/04
244/234
2,520,209 A * 8/1950 Hill .......................... 74/473.16
(Continued)

*Primary Examiner* — Daniel D Yabut
(74) *Attorney, Agent, or Firm* — Rickard K. DeMille; Rebecca L. Henkel

(57) ABSTRACT

A control device for a crawler vehicle comprises a control lever activated by an operator about a fulcrum and having a free end, the control lever being displaceable along a longitudinal direction of the vehicle between a proximal position closer to the operator and a distal position further from the operator in order to control a main clutch of the vehicle, the control device further comprising a support element suitable for being fixed to a body of the vehicle in order to support an operator's hand when the hand acts on the control lever, the control lever having an intermediate portion interposed between the free end and the fulcrum, the intermediate portion being so shaped as to partially embrace the support element in the proximal position.

13 Claims, 3 Drawing Sheets

(58) Field of Classification Search
CPC ........ G05G 9/047; E02F 9/2004; E02F 9/202;
E02F 9/0833; B62D 11/08; B62D 11/003;
B62D 1/14; B62D 1/12; B62D 1/043;
B62D 1/183; A01D 2034/6843; A01D
34/006; A01D 34/824; B62B 5/06; B62B
5/068; F16H 59/02
See application file for complete search history.

(56) References Cited

U.S. PATENT DOCUMENTS

| | | | |
|---|---|---|---|
| 3,333,485 A * | 8/1967 | Deli et al. | 74/490.14 |
| 3,540,220 A * | 11/1970 | Lauck | 60/423 |
| 3,645,149 A * | 2/1972 | Fitzpatrick et al. | 74/473.35 |
| 3,700,044 A * | 10/1972 | Berg | 172/812 |
| 3,795,156 A * | 3/1974 | Neuscheler | 74/523 |
| 4,126,987 A * | 11/1978 | Sarich | A01D 34/26 56/208 |
| 4,392,538 A * | 7/1983 | Goertzen | B62D 51/001 16/437 |
| 4,396,067 A * | 8/1983 | Enters | B62D 51/001 172/42 |
| 4,541,497 A * | 9/1985 | Riediger et al. | 180/6.48 |
| 4,865,142 A * | 9/1989 | Roy | B62D 1/12 180/19.2 |
| 4,905,804 A * | 3/1990 | LeFevre | 192/12 R |
| D437,569 S * | 2/2001 | Xidarakou | D11/222 |
| 2002/0108462 A1* | 8/2002 | Magrini et al. | 74/473.26 |
| 2005/0011696 A1* | 1/2005 | Bares | G05G 9/047 180/315 |
| 2006/0102392 A1* | 5/2006 | Johnson | A61G 7/08 180/19.1 |
| 2007/0062075 A1* | 3/2007 | Graham | G05G 9/047 37/234 |
| 2014/0090278 A1* | 4/2014 | Ricketts | E01H 5/045 37/197 |

* cited by examiner

CONTROL AND STEERING DEVICE FOR A CRAWLER VEHICLE

CROSS REFERENCE TO RELATED APPLICATIONS

This application is the U.S. National Stage filing of International Application Serial No. PCT/EP2011/069018, entitled "A CONTROL AND STEERING DEVICE FOR A CRAWLER VEHICLE," filed Oct. 28, 2011, which claims priority to Italian Application Serial No. MO2010A000304, filed Oct. 29, 2010, each of which is incorporated by reference herein in its entirety for all purposes.

TECHNICAL FIELD

The invention relates to a control and steering device for a crawler vehicle, the device being suitable for enabling an operator to modify the movement direction of the vehicle and control advancement thereof, by engaging or disengaging a main clutch of the vehicle. The control and steering device according to the invention can be mounted on a crawler vehicle such as an agricultural machine, for example a tractor, a construction machine or an industrial machine.

The invention further concerns a crawler vehicle comprising the control and steering device mentioned above.

BACKGROUND

Crawler vehicles normally comprise a motor connected to a transmission device by means of a main clutch. The transmission device rotates a right shaft and a left shaft, connected respectively to a right drive sprocket and a left drive sprocket, each of which is arranged for moving a corresponding track. A brake and a steering clutch are associated to each drive sprocket in order to enable the operator to steer in the corresponding direction. In particular, if the operator desires to steer to the right along a relatively wide steering arc, he simply has to disengage the steering clutch associated with the right track. If it is instead desired to steer to the right along a relatively narrow arc, in addition to disengaging the right steering clutch the operator must also act on the brake associated to the right track. Similar operations have to be performed on the left track if it is desired to steer the vehicle to the left.

Crawler tractors are known in which steering to the right and left, as well as engaging or disengaging the main clutch, can be performed by acting on a single control lever. In particular, the operator can disengage the main clutch by pulling the control lever towards himself, engage the main clutch by moving the control lever away from himself, and steer to the right or left respectively by moving the control lever towards the right or the left.

Tractors provided with a control lever of the above-described type have the advantage of concentrating a plurality of different functions in a single lever, which enables a reduction in the number of distinct control members with which the operator has to interact. However, in order to activate the control lever the operator has to incline the upper part of his body forwards, thereby detaching his back from the seat backrest of the tractor, in particular in a case in which it is desired to engage the main clutch. These movements can cause fatigue and back-ache for the operator, especially in a case in which the operator has to stay on the tractor for a period lasting many hours consecutively, during which he frequently acts on the control lever.

Furthermore, when the operator detaches his back from the backrest in order to activate the control lever, the upper part of the operator's body does not have a fixed resting point, which can compromise the operator's safety, especially in a case in which the tractor is working on terrains with a considerable slope.

An object of the invention is to improve vehicle control devices, especially for crawler vehicles.

A further object is to provide a control device which reduces the physical fatigue and back-ache for the operator.

A further object is to provide a control device which can be activated in conditions of improved safety for the operator.

According to the invention, there is provided a control device for a crawler vehicle, comprising a control lever that is activatable by an operator about a fulcrum and has a free end, the control lever being displaceable along a longitudinal direction of the vehicle between a proximal position, closer to the operator, and a distal position, further from the operator, in order to control a main clutch of the vehicle, the device further comprising a support element suitable for being fixed to a body of the vehicle in order to support an operator's hand while said hand acts on the control lever, characterised in that the control lever has an intermediate portion interposed between the free end and the fulcrum, the intermediate portion being shaped such as partially to embrace the support element in the proximal position.

In the proximal position, the intermediate shaped portion enables the control lever to the moved closer to the support element, in comparison with a straight control lever. Therefore, for a given stroke, the distance between the control lever and the support element can also be reduced in the distal position. In this way, even in the distal position the operator can act on the control lever with the fingers of one hand, while at the same time his wrist or palm of the same hand are resting on the support element.

This enables a limiting of the operator's back movements, and reduces the frequency with which the operator is forced to detach his back from the seat's backrest. Thus physical fatigue and the risk of back-ache for the operator are consequently reduced.

Further, since the wrist or palm is kept resting on the support element even when the control lever is in the distal position, the operator finds, in the support element, a stable rest point, even where the vehicle is working on terrain exhibiting a steep slope. This increases the operator's safety.

In an embodiment, the control lever is further oscillatable in a transverse direction of the vehicle in order to steer to the right or left. An arc-shaped resting zone projects from a central region of the support element; the operator's hand can move along this resting zone when the control lever is moved in the transverse direction.

The arc-shaped resting zone enables the distance between the support element and the free end of the control lever to be maintained substantially unchanged when the control lever is moved in the transverse direction, i.e. perpendicularly to the longitudinal direction. In this way, the operator's wrist or palm can be kept resting on the arc-shaped resting zone even when his fingers move along the transverse direction in order to displace the control lever correspondingly.

Thus the safety and drive comfort of the operator can be further improved.

SUMMARY OF THE INVENTION

A control device for a crawler vehicle, comprising a control lever activated by an operator about a fulcrum and having a free end, the control lever being displaceable along a longitudinal direction of the vehicle between a proximal position closer to the operator and a distal position further from the operator in order to control a main clutch of the vehicle, the control device further comprising a support element suitable for being fixed to a body of the vehicle in order to support an operator's hand when the hand acts on the control lever, wherein the control lever has an intermediate portion interposed between the free end and the fulcrum, the intermediate portion being so shaped as to partially embrace the support element in the proximal position.

BRIEF DESCRIPTION OF THE DRAWINGS

The invention will be better understood and carried out with reference to the attached drawings, which illustrate, by way of non-limiting example, an embodiment of the invention, and in which.

DETAILED DESCRIPTION OF THE EMBODIMENT(S)

Figure 1:
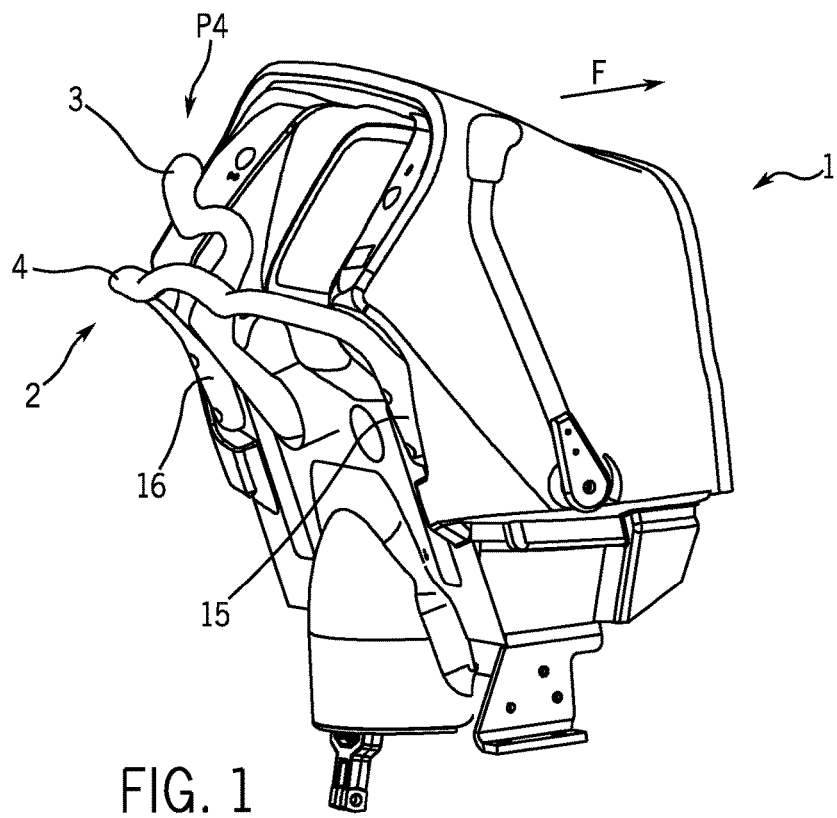
FIG. 1 is a perspective view, showing a portion of a vehicle comprising a control and steering device.

FIG. 1 shows a control console 1 of a crawler vehicle, in particular an agricultural machine such as a tractor, or a construction machine or an industrial machine. The control console 1 is located in front of a seat for an operator, with respect to an advancement direction F of the crawler vehicle, such as to enable the operator to activate the controls necessary for driving the vehicle while the operator looks forward.

The control console 1 comprises a control and steering device 2 suitable for controlling advancement of the crawler vehicle, by engaging or disengaging a main clutch, and for steering to the right or to the left. The control and steering device 2 comprises a control lever 3, which the operator can move with a hand, and a support element 4, suitable for being fixed to a body of the vehicle such as to be interposed between the control lever 3 and the seat.

The support element 4 is suitable for supporting the operator's hand as it acts on the control lever 3. To this end, the support element 4 is configured such that the operator can maintain his wrist or palm resting on the support element 4 while he moves the control lever 3 with the fingers of the same hand.

The control lever 3 is connected to an actuating system which is not illustrated, the actuating system allowing the main clutch to be engaged or disengaged, and further acting on a steering clutch and possibly also on a brake associated to the right track or left track, such as to steer respectively to the right or left. The above-mentioned actuating system can be of hydraulic, mechanical or other kind, and it is not described in detail in the following as it is of known type. An example of an actuating system connectable to the control lever 3 is disclosed in European patent application EP 2045169, filed in the name of the same applicant as the present patent application.

In particular, in order to engage or disengage the main clutch, the control lever 3 is displaced along a longitudinal direction of the crawler vehicle, i.e. parallel to the advancement direction F. In this way the control lever 3 can be moved between a proximal position P5, shown in FIGS. 2 and 6, in which the control lever 3 is closer to the operator's body, and a distal position P1, in which the control lever 3 is further from the operator's body.

The control lever 3 can also be moved transversely, in particular perpendicularly, to the longitudinal direction of the crawler vehicle in order to act on the steering clutch and/or the brake associated to the right or left track, such as to be able to steer respectively to the right or left.

All of the above-described movements of the control lever 3 can be performed with a single hand. The operator's other hand is therefore free to activate further controls, for example those relating to the implements borne by the crawler vehicle.

Figure 2:
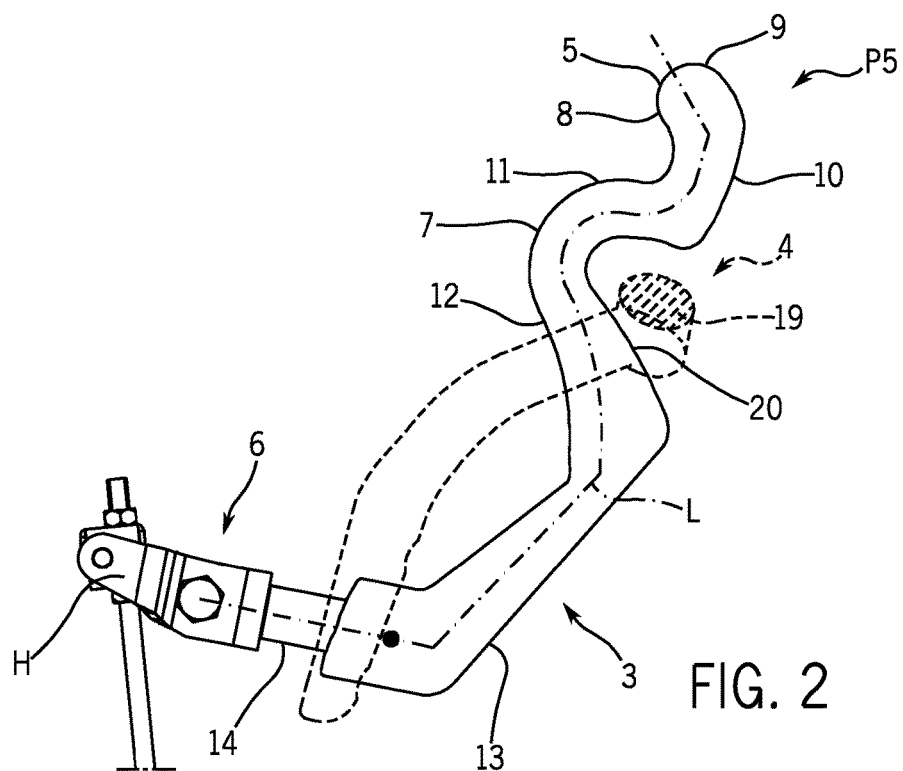
FIG. 2 is an enlarged side view, showing a control lever of the control and steering device of FIG. 1.

FIG. 2 shows in detail the control lever 3, which comprises a free end 5 and a fastening end 6, opposite the free end 5, hinged to a frame of the vehicle in a fulcrum H.

An intermediate portion 7 is interposed between the free end 5 and the fastening end 6, the intermediate portion 7 being so shaped that when the control lever 3 is in the proximal position P5, i.e. in the position closest to the operator's body and thus to the support element 4, the intermediate portion 7 partially embraces the support element 4, i.e. it is arranged around a portion of the support element 4.

To this end, the control lever 3 extends along a longitudinal axis L which is not straight as in traditional levers, but which, at the intermediate portion 7, exhibits a curved geometry with a concavity facing towards the support element 4.

In this way, the intermediate portion 7 defines a bend in the control lever 3, for example a C-shaped bend. Internally of this bend a section of the support element 4 can be received when the control lever 3 is in the closest position to the operator, as schematically shown in FIG. 2.

The control lever 3 further comprises a modulating portion 10, interposed between the intermediate portion 7 and the free end 5. As will more clearly emerge in the following, by acting on the modulating portion 10 the operator can modulate the position of the main clutch, such as to cause a controlled "skating" thereof. The modulating portion 10 can have a substantially straight shape.

The free end 5 is bent forward with respect to the modulating portion 10, i.e. it is inclined such as to face towards a side opposite to the support element 4. The free end 5 is delimited by a front operating surface 8, facing forward with respect to the advancement direction F of the vehicle, and by a rear operating surface 9, opposite the front operating surface 8. As will emerge more clearly herein below, this conformation of the free end 5 enables the main clutch of the crawler vehicle to be rapidly engaged and disengaged.

The intermediate portion 7 comprises an upper branch 11 and a lower branch 12, between which there is defined the concavity which is arranged for receiving a section of the support element 4. The lower branch 12 is longer than the upper branch 11. In the proximal position P5, as shown in FIG. 2, the upper branch 11 is arranged above the support element 4 while the lower branch 12 is arranged below the support element 4.

Along the lower branch 12, the longitudinal axis L of the control lever 3 is shaped approximately as an arc of a circle centred on the fulcrum H. As will be better explained herein below, this geometry makes it easier for the operator to displace the control lever 3 rightwards or leftwards even when the control lever 3 is in the distal position P1.

The control lever 3 can further comprise a connecting portion 13, which from the intermediate portion 7 extends downwards, and possibly an initial portion 14 interposed between the connecting position 13 and the fulcrum H.

In the connecting portion 13 and in the initial portion 14 the longitudinal axis L of the control lever 3 can extend along respective straight segments, having different inclinations to one another.

Figure 3:
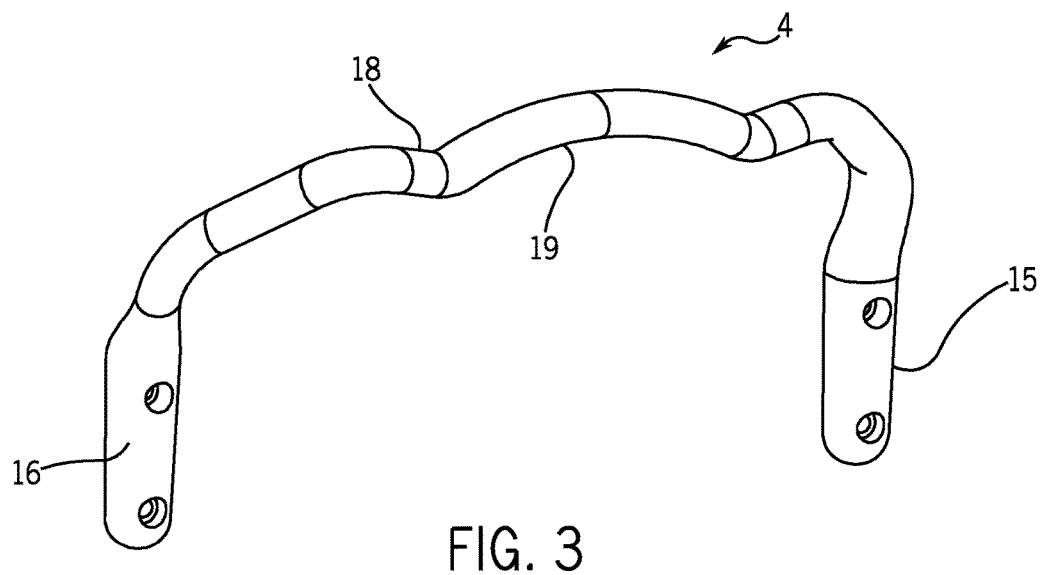
FIG. 3 is an enlarged perspective view, showing a support element of the control and steering device of FIG. 1.

FIG. 3 shows a support element 4 suitable for being used in combination with the control lever 3.

Figure 5:
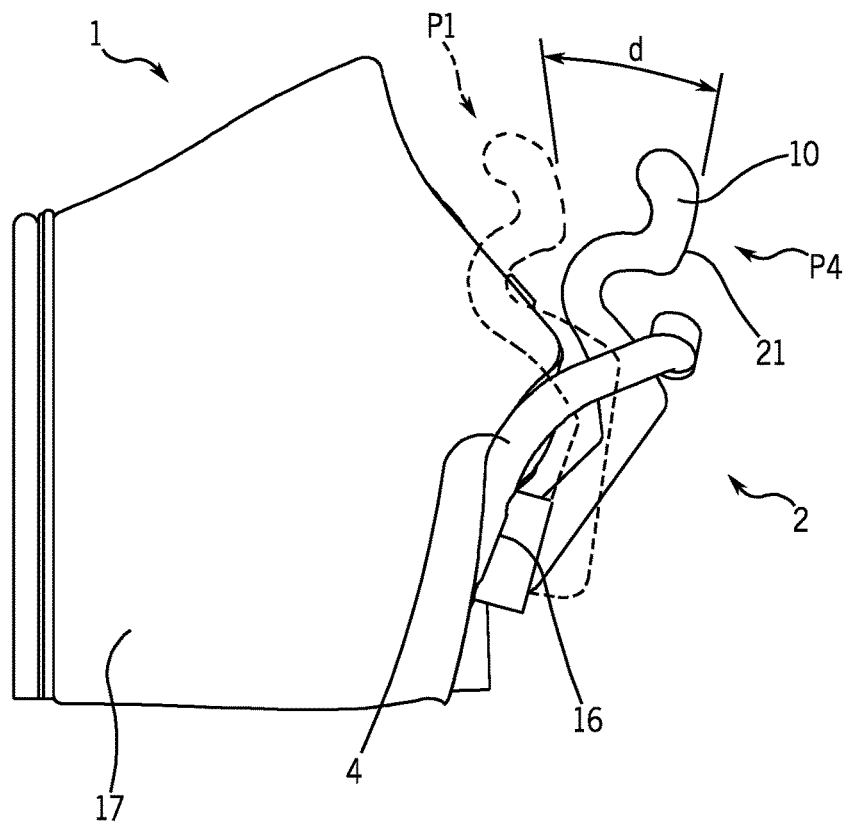
FIG. 5 is a view like in FIG. 1, showing a distal position and an intermediate position of the control lever.

The support element 4 comprises a right anchoring appendage 15 and a left anchoring appendage 16 suitable for fastening the support element 4 to the body of the crawler vehicle, for example by removable fastening means, such as threaded elements. As shown in FIGS. 1 and 5, in the illustrated example the right anchoring appendage 15 and the left anchoring appendage 16 are fixed to a box casing 17 which externally delimits the control console 1.

The right anchoring appendage 15 and the left anchoring appendage 16, when fixed to the vehicle body, are arranged in a substantially vertical position.

During use, the right anchoring appendage 15 and the left anchoring appendage 16 are positioned respectively in proximity of the right leg and the left leg of the operator.

The support element 4 further comprises a handrail 18 interposed between the right anchoring appendage 15 and the left anchoring appendage 16 such as to be at a distance from the box casing 17. The handrail 18 extends prevalently transversely with respect to the advancement direction F, i.e. with respect to the longitudinal direction of the crawler vehicle.

The handrail 18 comprises a central region destined for restingly receiving the operator's wrist or palm, while the fingers of the same hand displace the control lever 3. The central region therefore defines, in the handrail 18, a resting zone 19 for the operator's hand. The resting zone 19 is arc-shaped, for example shaped as an arc of circumference.

The resting zone 19 projects upwards from the handrail 18. In other words, the resting zone 19 defines in the handrail 18 a concave zone having a concavity facing downwards, i.e. towards the operator's feet.

As will more fully emerge herein below, owing to the conformation of the resting zone 19, in the position further from the operator's body the control lever 3 can be displaced rightwards or leftwards about the fulcrum H without significantly modifying the distance between the free end 5 and the resting zone 19.

The support element 4 can have a symmetrical configuration with respect to a central vertical plane of the crawler vehicle.

As shown in FIG. 2, the resting zone 19 has a cross-section which is flattened, in particular elliptical. The cross-section of the resting zone 19 prevalently extends along a horizontal direction, or along a non-excessively inclined direction, in particular less inclined than 45°, with respect to the horizontal direction. This shape of the cross-section enables a reduction of the dimension of the handrail 18 transversely to the main dimension of the cross-section, and also enables an increase in the upper surface of the resting zone 19 which is available for the operator's hand. In this way, the operator's hand can rest stably on the resting zone 19.

During operation of the crawler vehicle according to the illustrated example, the distal position P1 of the control lever 3, i.e. the position in which the control lever 3 is further from the operator's body, corresponds to a configuration in which the main clutch of the crawler vehicle is engaged. The crawler vehicle is thus advancing with advancement conditions such as speed, gear transmission ratio and so on, which are selected by the operator using controls that are not illustrated.

Figure 6:
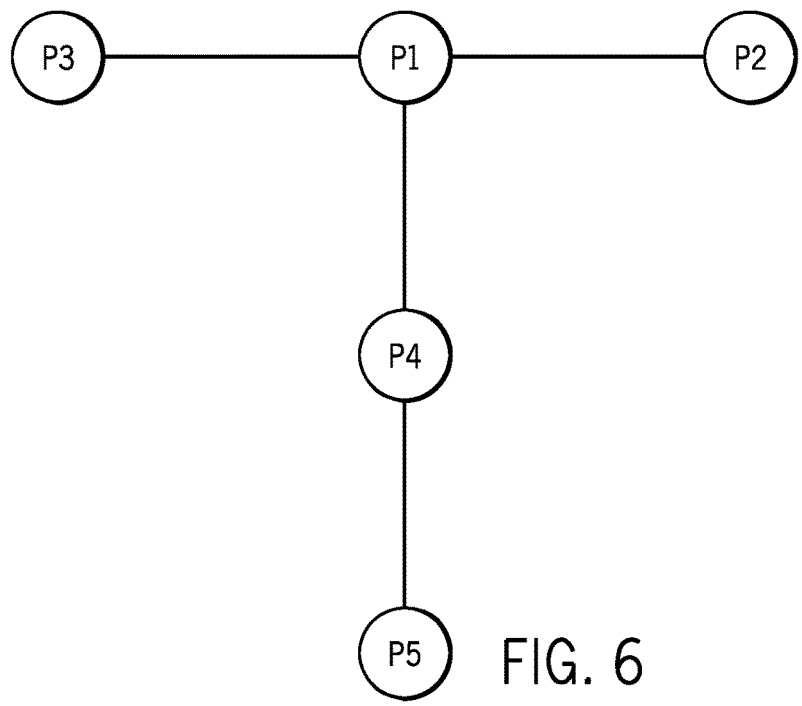
FIG. 6 is a diagram showing the main positions of the control lever.

If, in particular, when the main clutch is engaged, the control lever 3 is maintained in the distal position P1 shown in FIG. 6, i.e. along a central vertical plane of the crawler vehicle, the crawler vehicle proceeds straight along the advancement direction F.

Figure 4:
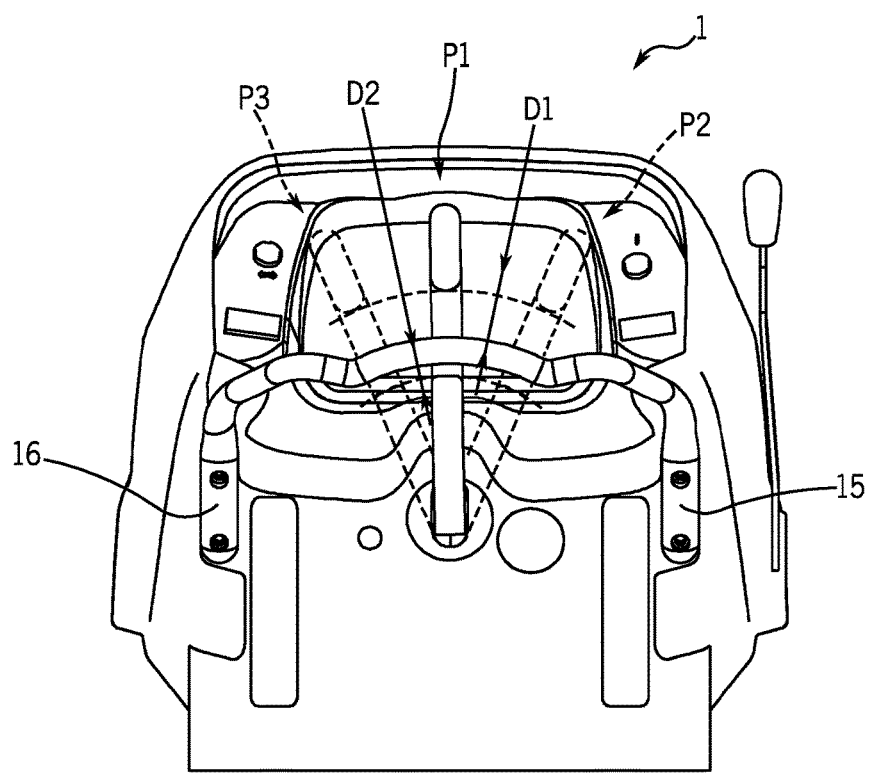
FIG. 4 is a front view of the control and steering device of FIG. 1, showing a central position, a position inclined towards the right and a position inclined towards the left of the control lever.

If on the other hand, when the main clutch is engaged, the control lever 3 is inclined rightwards about a fulcrum H, thus reaching the right distal position P2 indicated in FIGS. 4 and 6, the crawler vehicle steers rightwards.

Similarly, by inclining the control lever 3 towards the left, up to reaching the left distal position P3 shown in FIGS. 4 and 6, the crawler vehicle can be steered leftwards.

The control lever 3 can further assume an intermediate position P4 interposed between the distal position P1 and the proximal position P5, as shown in FIGS. 1 and 6. In the illustrated example, the intermediate position P4 can be defined as a stable neutral position, in which the main clutch is disengaged. The crawler vehicle is therefore stationary.

Using return means, not illustrated, it is possible to ensure that if the control lever 3 is released in any position interposed between the distal position P1 and the stable neutral position P4, the control lever 3 is automatically returned into the stable neutral position P4.

The proximal position P5 of the control lever 3 corresponds to a configuration in which a gearing mechanism of the vehicle gearbox is braked in order to easily engage a gear. This occurs because, when displacing the control lever 3 from the stable neutral position P4 to the proximal position P5, a transmission brake is activated. The transmission brake is a known-type mechanism, not illustrated in the figures, which enables the gearing mechanism of the vehicle gearbox to be halted such that the operator can engage the gears gently, i.e. without clashing.

The return means ensure that if the control lever 3 is released in the proximal position P5, or in any position interposed between the stable neutral position P4 and the proximal position P5, the control lever 3 reaches automatically the stable neutral position P4.

If, starting from the distal position P1 in which the main clutch is engaged, the operator wishes to change gear, he has to perform the sequence of actions that is described below. First of all, the operator pulls the control lever 3 towards his body along the longitudinal direction, by rotating the control lever 3 around the fulcrum H thereof. The actuating system operated by the control lever 3 consequently displaces a shaft supporting a plate of the main clutch and disengages the main clutch. The stable neutral position P4 is therefore reached.

Thereafter, the operator further pulls the control lever 3 towards himself, thereby further moving the shaft supporting the plate of the main clutch in order to activate the transmission brake. The proximal position P5 is therefore reached, and the gearing mechanism of the vehicle gearbox is halted.

After halting the gearing mechanism by means of the transmission brake, the operator can release the control lever 3, which is automatically brought back into the stable neutral position P4 by the return means. At this point, the operator can change gear by using a lever which is not shown.

Thereafter, the operator pushes the control lever 3 to the distal position P1 so that the actuating system re-engages the main clutch.

The control lever 3 can be moved to the left or to the right in the distal position P1, in the proximal position P5 or in any position interposed therebetween. Thus, the operator can act on the steering clutches and possibly on the corresponding brakes in order to steer the vehicle even when changing gear.

The control lever 3 and the support element 4 have an ergonomic conformation which makes it particularly easy for the operator to displace the control lever 3 between the numerous above-described operating positions.

In particular, owing to the intermediate portion 7 of the control lever 3 which, in the proximal position P5, embraces the cross-section of the handrail 18 along a part of the perimeter thereof, it is possible to move the control lever 3 closer to the handrail 18 in the proximal position P5, with respect to a case of a lever having a straight geometry. The concavity defined by the intermediate portion 7 prevents the control lever 3 from impacting against the handrail 18 when the transmission brake is completely activated. Owing to the intermediate portion 7, in the proximal position P5 the free end 5 of the control lever 3 can be aligned with the handrail 18, or even positioned behind the handrail 18 with respect to the advancement direction F.

By minimising the distance between the control lever 3 and the handrail 18 in the proximal position P5, it is also possible, for a determined stroke of the control lever 3, to reduce the distance between the control lever 3 and the handrail 18 in the distal position P1.

Also the distance d, shown in FIG. 5, between an active surface 21 of the modulating portion 10 in the distal position P1 and in the stable neutral position P4 is decreased. This distance corresponds to the real distance travelled by an operator's finger, particularly the thumb, when displacing the control lever 3 from the stable neutral position P4 to the distal position P1, for example while modulating the main clutch.

In an embodiment, the distance d can be less than 10 cm, preferably 8 cm or less.

Therefore, the operator can displace the control lever 3 along the longitudinal direction of the vehicle, i.e. from the proximal position P5 to the distal position P1 and vice versa, without detaching the wrist or palm from the resting zone 19 of the handrail 18 and without inclining the upper part of his body forwards. This enables an increase in the stability and thus the safety of the operator seated on the crawler vehicle.

Furthermore, it is easier for the operator to displace the control lever 3 when the control lever 3 is in the distal position P1, for example by moving it between the distal position P1 and the right distal position P2 or between the distal position P1 and the left distal position P3.

The points of the control lever 3 move approximately along an arc of circumference when the control lever 3 is displaced between the distal position P1 and the right distal position P2, or between the distal position P1 and the left distal position P3. Since the resting zone 19 of the handrail 18 is also arc-shaped, the distance between the control lever 3 and the resting zone 19 of the handrail 18 is substantially unchanged while the control lever 3 is moved perpendicularly to the longitudinal direction.

This is clearly shown in FIG. 4, in which the distance between the resting zone 19 and the lowest part of the modulating portion 10 is indicated by D1. This distance remains substantially constant while the operator moves the control lever 3 rightwards or leftwards.

Consequently, when the operator moves the control lever 3 perpendicularly to the longitudinal direction of the vehicle with the fingers of one hand, the wrist or palm of the same hand can move along the resting zone 19 of the handrail 18 without detaching therefrom.

The handrail 18 thus provides a stable resting point for the wrist or the palm of the operator's hand while the fingers of the same hand displace the control lever 3 leftwards or rightwards in order to steer, for example by gripping the lower branch 12 of the shaped portion 7 at a gripping portion 20, shown in FIG. 2. The gripping portion 20 can be gripped between the thumb and index finger of the operator, or between the index and the middle finger. As shown in FIG. 4, also the distance D2 between a lower surface of the resting zone 19 and the gripping portion 20 remains substantially constant when the control lever 3 is tilted to the left or to the right starting from the distal position P1.

If the operator wishes to pass rapidly from the stable neutral position P4 to the distal position P1, in which the crawler vehicle moves straight forwards, it is sufficient to push forwards, using the fingers, the rear operating surface 9 of the free end 5. In this way the operator distances the control lever 3 from himself up to engaging the main clutch. This time too it is not necessary to detach the hand from the handrail 18.

To disengage the main clutch, the operator can instead pull the control lever 3 towards himself by acting on the front operating surface 8 of the free end 5. In this way the control lever 3 can be displaced from the distal position P1 into the stable neutral position P4. The shape of the free end 5, delimited by the front operating surface 8 and the rear operating surface 9, makes it easier to rapidly displace the control lever 3 from the distal position P1 to the stable neutral position P4 in emergency cases. Thus, the main clutch can be easily disengaged in order to stop the vehicle.

Starting from the stable neutral position P4, the operator might also desire to modulate the main clutch, such that the crawler vehicle moves slowly and precisely along the advancement direction F, for example in order to attach an implement.

In this case, the operator can grip the modulating portion 10 of the control lever 3 between the thumb and the index finger and displace the control lever 3 slightly forward or backward in order to engage or alternatively disengage the main clutch. Thus a sort of controlled clutch skating is performed, which enables the crawler vehicle to be displaced by small quantities.

From the above it is clear that the conformation of the control lever 3 enables the control lever 3 to be displaced between the different operating positions with one hand only, safely and without undue fatigue on the part of the operator, who can keep his hand resting on the support element 4 without continuously displacing his back forwards and backwards.

It is finally noted that a control lever 3 of the above-described type, i.e. provided with a portion so shaped as to partially surround the support element 4, might also be used in a control device which enables engaging or disengaging the main clutch without however including a steering function, i.e. in a control device in which the control lever 3 is movable only in the longitudinal direction of the vehicle.

The invention claimed is:

1. A control device for a crawler vehicle, comprising:
a control lever positioned at least partially in a control console, the control lever activated by an operator about a fulcrum and having a free end, the control lever being displaceable along a longitudinal direction of the vehicle between a proximal position closer to a seat for the operator and a distal position further from the seat for the operator in order to control a main clutch of the vehicle, the control device further comprising
a support element fixed to the control console of the vehicle, the support element including a lower portion having a pair of anchoring appendages and an upper portion opposite the lower portion, each anchoring appendage unmovably fastened at one end to opposite sides of an operator-facing portion of the control console, the upper portion of the support element including a handrail connected to each free end of each anchoring appendage and extending across the control console, the handrail including an arc-shaped central region projecting outward relative to first and second adjacent side regions of the handrail such that the arc-shaped central region is curved outwardly away from the lower portion of the handrail between the adjacent side, the first adjacent side region extending outwardly from one of the anchoring appendages and connecting directly to one end of the arc-shaped central region, the second adjacent side region extending outwardly from another of the anchoring appendages and connecting directly to an opposed end of the arc-shaped central region;
wherein the control lever has an intermediate portion interposed between the free end and the fulcrum, the intermediate portion being positioned between the arc-shaped central region of the handrail and the control console, the intermediate portion including a lower branch and an upper branch joined to one another so as to define a bend that partially surrounds a portion of the arc-shaped central region of the handrail when the control lever is positioned in the proximal position.

2. The control device according to claim 1, wherein, at the arc-shaped central region, the handrail has an approximately elliptical cross-section, the cross-section having a major axis inclined by an angle of less than 45° with respect to a horizontal direction.

3. The control device according to claim 1, wherein the pair of anchoring appendages further comprise a right anchoring appendage and a left anchoring appendage which extend in substantially vertical directions.

4. The control device according to claim 1, wherein the control lever extends along a longitudinal axis which, in the intermediate portion, has a curved geometry with a concavity facing towards the support element.

5. The control device according to claim 1, wherein the control lever extends along a longitudinal axis, the longitudinal axis being shaped along the lower branch of the intermediate portion of the control lever so as to follow an arc of circumference centered in the fulcrum.

6. The control device according to claim 5, wherein a modulating portion is interposed between the free end and the intermediate portion of the control lever, the modulating portion being operable for performing a controlled skating of the main clutch, the modulating portion extending preferably along a substantially straight line.

7. The control device according to claim 6, wherein the free end of the control lever is inclined in a forward direction with respect to the modulating portion.

8. The control device according to claim 7, wherein the distal position corresponds to a configuration in which the main clutch is engaged.

9. The control device according to claim 8, wherein said proximal position corresponds to a configuration in which a gearing mechanism of the vehicle gearbox is braked in order to easily engage a gear.

10. The control device according to claim 9, wherein a stable neutral intermediate position is provided between the proximal position and the distal position, and the control lever moves into the stable neutral intermediate position when the control lever is released in the proximal position or in a position interposed between the proximal position and the distal position.

11. The control device according to claim 1, wherein the handrail extends directly between the pair of anchoring appendages.

12. The control device according to claim 1, wherein a portion of the arc-shaped central region is positioned between the upper branch and the lower branch when the control lever is positioned in the proximal position.

13. The control device according to claim 1, wherein the first adjacent side region extends upwardly and transversely from one of the anchoring appendages to connect directly to one end of the arc-shaped central region and the second adjacent side region extends upwardly and transversely from another of the anchoring appendages to connect directly to the opposed end of the arc-shaped central region.

* * * * *